(12) United States Patent
Janson

(10) Patent No.: US 7,762,366 B2
(45) Date of Patent: *Jul. 27, 2010

(54) AXLE DRIVE UNIT FOR A HYBRID ELECTRIC VEHICLE

(75) Inventor: David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

This patent is subject to a terminal disclaimer.

(21) Appl. No.: 12/025,974

(22) Filed: Feb. 5, 2008

(65) Prior Publication Data

US 2009/0197727 A1  Aug. 6, 2009

(51) Int. Cl.
B60K 6/20 (2007.10)

(52) U.S. Cl. .................... 180/65.6; 180/65.7; 903/903; 475/5

(58) Field of Classification Search ............. 180/65.25, 180/65.285, 65.625, 65.1, 65.6, 242, 243, 180/249, 245, 65.21, 65.7; 903/903, 906, 903/907, 910; 701/69, 88, 89; 475/5, 19
See application file for complete search history.

(56) References Cited

U.S. PATENT DOCUMENTS

| | | | | |
|---|---|---|---|---|
| 5,058,700 A | * | 10/1991 | Shibahata | 180/245 |
| 5,718,300 A | * | 2/1998 | Frost | 180/65.1 |
| 5,742,917 A | * | 4/1998 | Matsuno | 701/69 |
| 6,041,877 A | * | 3/2000 | Yamada et al. | 180/65.25 |
| 6,059,064 A | * | 5/2000 | Nagano et al. | 180/243 |
| 6,164,400 A | | 12/2000 | Jankovic et al. | |
| 6,497,301 B2 | * | 12/2002 | Iida et al. | 180/249 |
| 6,499,549 B2 | | 12/2002 | Mizon et al. | |
| 6,579,201 B2 | * | 6/2003 | Bowen | 475/5 |
| 6,679,799 B2 | * | 1/2004 | Bowen | 475/5 |
| 6,692,394 B2 | | 2/2004 | Takenaka | |
| 6,796,412 B2 | | 9/2004 | Teraoka | |
| 6,857,985 B2 | * | 2/2005 | Williams | 477/5 |
| 6,945,347 B2 | | 9/2005 | Matsuno | |
| 7,497,286 B2 | * | 3/2009 | Keller et al. | 180/65.6 |
| 7,572,201 B2 | * | 8/2009 | Supina et al. | 475/5 |
| 7,651,426 B2 | * | 1/2010 | Yokoyama et al. | 475/19 |
| 7,669,683 B2 | * | 3/2010 | Yang | 180/242 |
| 2003/0181281 A1 | | 9/2003 | Duggan et al. | |
| 2006/0079370 A1 | | 4/2006 | Kushino | |
| 2007/0093344 A1 | | 4/2007 | Kira et al. | |
| 2007/0102209 A1 | | 5/2007 | Doebereiner | |

* cited by examiner

*Primary Examiner*—Hau V Phan
(74) *Attorney, Agent, or Firm*—David B. Kelley; MacMillan, Sobanski & Todd, LLC

(57) ABSTRACT

A drive unit for a hybrid electric motor vehicle includes an engine, an electric machine including a rotor, a layshaft gearset including an input driveably connected to the engine and an output, for transmitting power between the input and the output and producing a first speed differential that causes a speed of the input to exceed a speed of the output, first and second driveshafts, a differential mechanism driveably connected to the output, for transmitting power between the output and the driveshafts, and a planetary gear unit driveably connected to the output and the rotor, for transmitting power between the rotor and the output and producing a second speed differential that causes a speed of the rotor to exceed the speed of the output.

20 Claims, 3 Drawing Sheets

AXLE DRIVE UNIT FOR A HYBRID ELECTRIC VEHICLE

BACKGROUND OF THE INVENTION

1. Field of the Invention

This invention relates generally to a powertrain for a vehicle, and, more particularly, to a powertrain having multiple power sources including an electric motor for driving a set of vehicle wheels.

2. Description of the Prior Art

Hybrid electric powertrains have been developed that include an electric motor and an internal combustion (IC) engine, which can operate independently or in combination depending on the driving conditions, the state of charge of a traction battery, and the power source that most efficiently meets the current power demands imposed by the vehicle operator.

Most electric hybrid vehicles available commercially are front wheel drive vehicles, in which only the front wheels are driven. Hybrid electric powertrains being developed for use in four-wheel drive vehicles allow both the motor and engine to transmit power to a rear set of driven wheels.

When packaging an electric motor drive unit for a rear axle it is preferable to use a layshaft power flow such that the motor drive unit is placed on the rear axle centerline. Such electric hybrid drive systems, however, present packaging difficulties to the vehicle designer, particularly when layshaft gearing is used to transmit power from a longitudinal drive shaft to a rear axle.

A need exists for a hybrid electric powertrain in which one axle is driven by an electric motor or an IC engine in combination with the motor. To minimize cost, an electric machine would provide all hybrid functions including electric energy generation, electric vehicle launch, engine starting, electric boosting of engine power, and regenerative braking.

SUMMARY OF THE INVENTION

A drive unit for a hybrid electric motor vehicle includes an engine, an electric machine including a rotor, a layshaft gearset including an input driveably connected to the engine and an output, for transmitting power between the input and the output and producing a first speed differential that causes a speed of the input to exceed a speed of the output, first and second driveshafts, a differential mechanism driveably connected to said output, for transmitting power between said output and the driveshafts, and a planetary gear unit driveably connected to the output and the rotor, for transmitting power between said rotor and said output and producing a second speed differential that causes a speed of the rotor to exceed the speed of the output.

A torque reaction for the speed reduction planetary gearing is provided on a housing through a bore of a shaft or drum rather than through an outer diameter of the housing, thereby simplifying the bearing support requirements and allowing compact positioning of the mechanical drive elements.

Use of planetary gearing to reduce the speed of elements driven by the electric machine in the electric only drive path reduces the size of the package space required for the drive unit.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF TIE DRAWINGS

The invention will be more readily understood by reference to the following description, taken with the accompanying drawings, in which.

DESCRIPTION OF TIE PREFERRED EMBODIMENT

Figure 1:
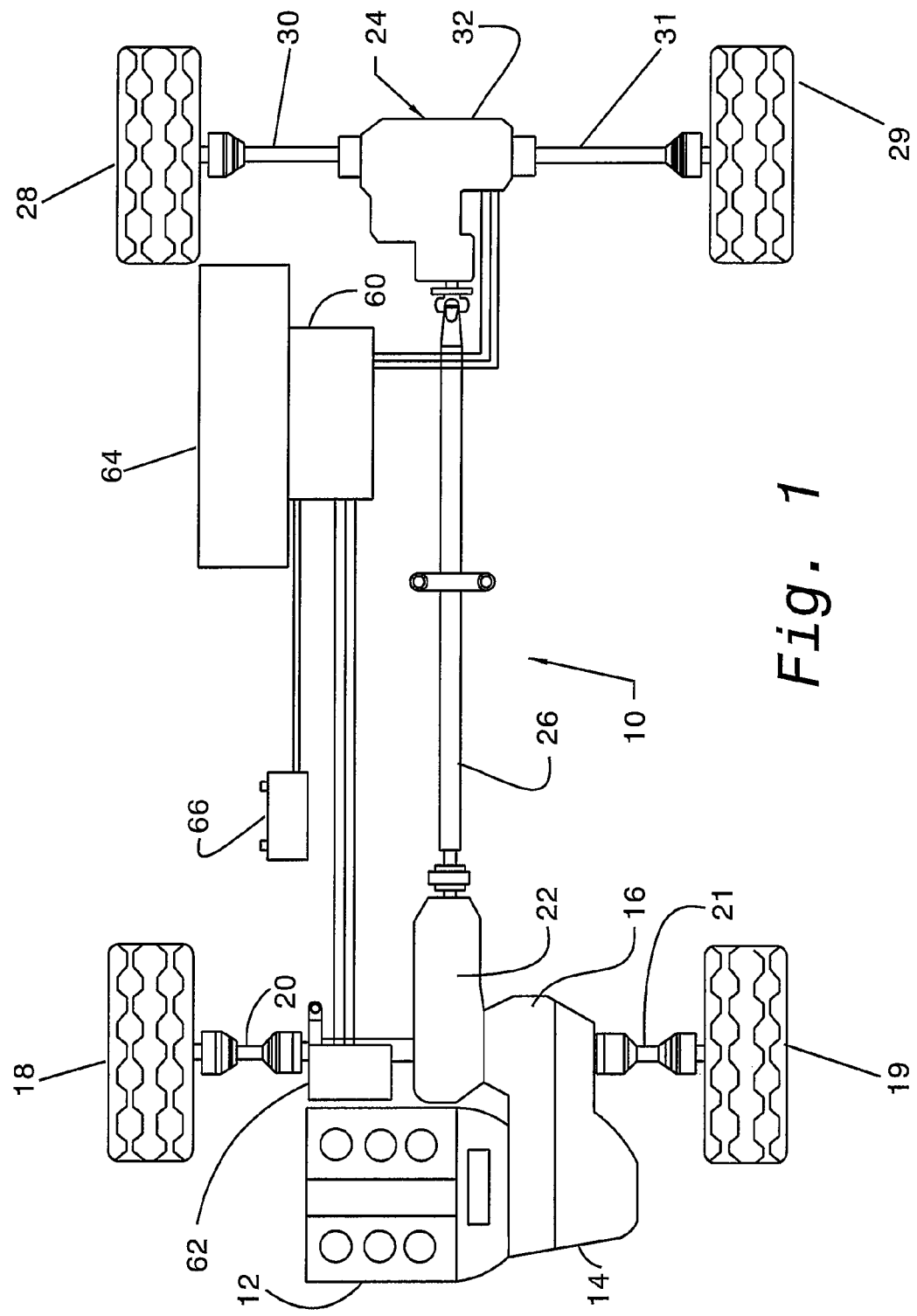
FIG. 1 is a schematic diagram of a powertrain for a hybrid electric vehicle, whose rear axle shafts are driven by an electric rear axle drive (ERAD) unit.

The powertrain 10 for a hybrid electric motor vehicle illustrated in FIG. 1 includes an IC engine 12, a transmission 14, which drives a front final drive unit 16 connected to a pair of front wheels 18, 19 by front drive shafts 20, 21. Transmission 14 may be a manual gearbox or any type of automatic transmission. The front final drive unit 16 also drives a rear drive take-off unit 22, which is connected to a rear final drive unit 24, i.e., the ERAD unit, by a longitudinal prop shaft 26. The ERAD unit 24 is driveably connected to a pair of rear wheels 28, 29 by rear drive shafts 30, 31. The ERAD unit 24 includes a casing 32, which contains the inboard ends of the rear drive shafts 30, 31.

Figure 2:
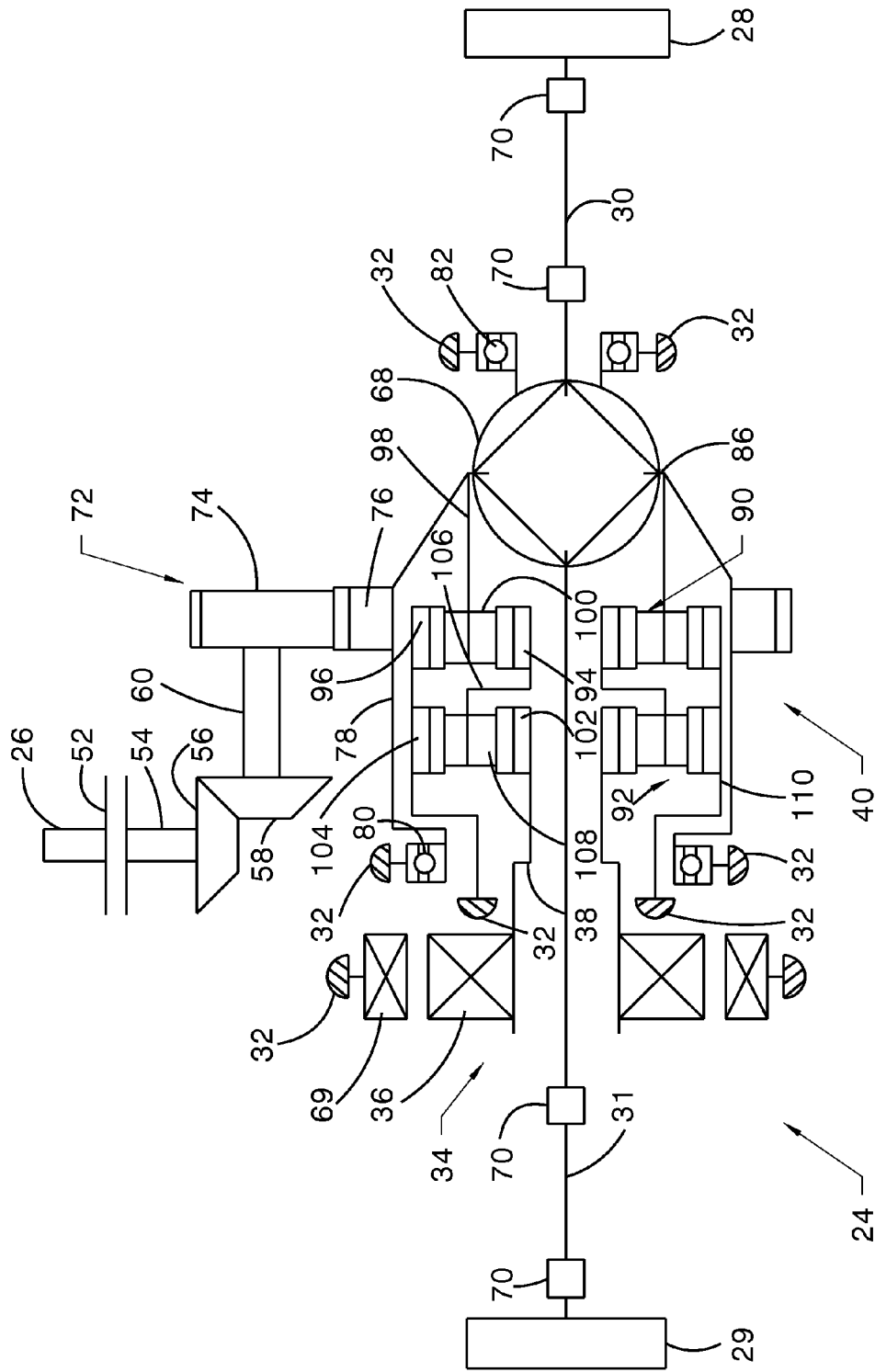
FIG. 2 is schematic diagram of the ERAD unit.

FIG. 2 shows an electric machine 34, such as a motor/generator, arranged transversely in the ERAD unit 24. The electric machine 34 includes a hollow rotor 36, which is connected by a sleeve shaft 38 to a speed reduction planetary gear unit 40.

A clutch or coupler 52 alternately opens and closes a drive connection between prop shaft 26 and a shaft 54, which is secured to a final drive bevel pinion 56. A bevel gear 58 meshes with bevel pinion 56 and is secured to a layshaft 60.

The motor/generator 34 is controlled by an electronic control unit (ECU) 61. Electric power and rotating power are generated by the motor/generator 34 and by another motor/generator, a starter/generator 62, which alternately drives and is driven by the engine 12. Both the motor/generator 34 and the starter/generator 62 alternately draw electric current from and supply electric current to a traction battery 64 and an auxiliary battery 66. The traction battery 64 is a high voltage unit. The auxiliary battery 66 is a 12V unit for the supply and control of the vehicle electrical systems.

The engine 12 drives the front wheels 18, 19 through transmission 14, the front final drive unit 16 and the front drive shafts 20, 21, while also driving the rear wheels 28, 29 through the rear take-off unit 22, prop shaft 26, ERAD unit 24 and the rear drive shafts 30, 31. The torque capacity of coupler 52 varies as required to produce a variable split of engine torque between the front and rear wheels.

Under low vehicle speed driving conditions, the electric motor/generator 34 is used to drive the vehicle with the engine 12 stopped, in which case the coupler 52 is disengaged and the rear wheels 28, 29 are driven through the speed reduction planetary gear unit 40 and a differential mechanism 68. Under heavier load at low vehicle speed, the motor/generator 34 can be used to supplement power produced by the engine 12. At higher vehicle speed, engine 12 is the primary power source for driving wheels 28, 29.

Casing 32 supports the various shafts and gear elements of the speed reduction planetary gear unit 40 and the stator 69 of the motor/generator 34. The drive shafts 30, 31 each comprise an inner shaft extending inside the casing 32, an outer shaft outside the casing 32 and extending toward a respective rear wheel 28, 29, and universal joints 70 connecting the inner and outer shafts and the wheel.

In the ERAD embodiment illustrated in FIG. 2, bevel pinion 56 meshes continually with a bevel gear 58, which is driveably connected by layshaft 60 to a layshaft speed reduction gearset 72, which includes a pinion 74 and gear 76, secured to a drum 78. Bearings 80, 82 fitted into casing 32, support drum 78 in rotation about a lateral axis 84, which is concentric with shafts 30, 31. The layshaft gearset 72 drives drum 78 and the input 86 of differential mechanism 68 at one-third the speed of layshaft 60, bevel gear 58 and pinion 74.

The speed reduction planetary gear unit 40 includes two interconnected planetary gear sets 90, 92. Gear set 90 includes sun gear 94, ring gear 96, a carrier 98 secured to differential input 86, and a set of planet pinions 100, supported for rotation on carrier 98 and meshing with ring gear 96 and sun gear 94. Gear set 92 includes a second sun gear 102, second ring gear 104, a second carrier 106 secured to sun gear 94, and a second set of planet pinions 108, supported for rotation on carrier 106 and meshing with ring gear 104 and sun gear 102. Ring gears 96, 104 are mutually connected by a drum 110, which is grounded on casing 32. Sun gear 94 is secured to carrier 106 for rotation as a unit. Sun gear 102 is driveably connected by shaft 38 to the rotor 36 of motor/generator 34.

The angular velocity of sun gear 94 is preferably about three times greater than that of carrier 98, and the angular velocity of sun gear 102 is about three times greater than that of carrier 106. Therefore, rotor 36, shaft 38 and sun gear 102 rotate about nine times faster than differential input 86 and drum 78, when the motor/generator 34 drives wheels 28, 29 through differential 68.

Differential 68 may be of the type comprising a ring gear that rotates about the lateral axis of drive shafts 30, 31, a spindle driven by the ring gear and is revolving about the lateral axis, bevel pinions secured to the spindle for revolution about the lateral axis and rotation about the axis of the spindle, and side bevel gears meshing with the bevel pinions, each side bevel gear being secured to one of the drive shafts 30, 31.

Figure 3:
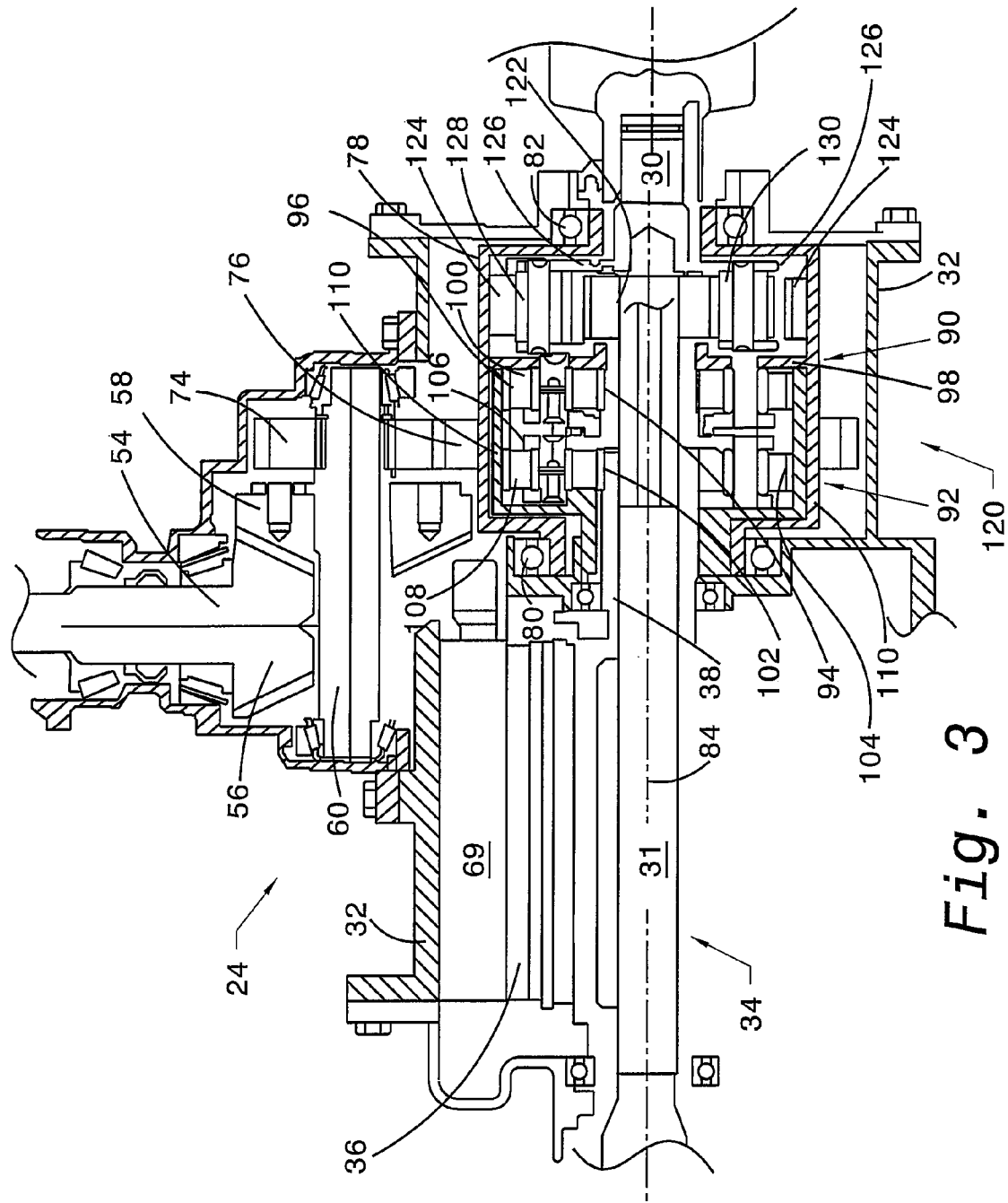
FIG. 3 is a cross section view of the ERAD unit of FIG. 2.

As FIG. 3 illustrates, the differential mechanism 68 may be a double planetary differential mechanism 120, which includes a sun gear 122 driveably connected to drive shaft 31; a ring gear 124, driveably connected by drum 78, gear 76 and pinion 74 to layshaft 60 gear 80; a carrier 126 driveably connected to drive shaft 30; a first set of planet pinions 128, supported for rotation on carrier 126 and meshing with ring gear 124; and a second set of planet pinions 130, supported for rotation on carrier 126 and meshing with sun gear 122 and the first planet pinions 128.

A power path for transmitting power from engine 12 to the rear axle drive unit 24 includes transmission 14, rear drive take-off unit 22, and prop shaft 26. A first power path within ERAD unit 24 transmits power from prop shaft 26 through coupler 52, bevel pinion 56, bevel gear 58, layshaft 60, layshaft pinion 74, gear 76, drum 78 and differential mechanism 68 to the rear axle shafts 30, 31 and rear wheels 28, 29.

When coupler 52 is open and the motor/generator 34 is operating as an electric motor, a second power path within ERAD unit 24 transmits power from the rotor 36 of the motor/generator 34 through shaft 38, speed reduction gearsets 92, 90, carrier 98, and differential mechanism 68 to the rear axle shafts 30, 31 and rear wheels 28, 29.

When coupler 52 is open and the motor/generator 34 is operating as an electric generator, power from the rear wheels 28, 30 is transmitted in a reverse direction through the second power path to drive the rotor 36 so that the motor/generator 34 can generate electric current.

The coupler 52 may be located in the front drive take-off unit 22 instead of in the ERAD unit 24.

The front drive take-off unit 22 may incorporate a center differential, which continually splits the torque between the front wheels 18, 19 and the rear wheels 28, 29, in which case the coupler or clutch 52 may be omitted.

Although the powertrain 10 has been described as having the engine 12 at the vehicle front, the engine and transmission 14 may be located at the rear of the vehicle, or the engine may be located at the front and arranged along the longitudinal axis of the vehicle with a transmission located behind the engine. References to "front" and "rear" in this description are used primarily to describe the relative positions of components.

In accordance with the provisions of the patent statutes, the preferred embodiment has been described. However, it should be noted that the alternate embodiments can be practiced otherwise than as specifically illustrated and described.

The invention claimed is:

1. A drive unit, comprising:
   an electric machine including a rotor;
   a differential including an input;
   gearing transmitting power through a coupler between an engine and said input such that input speed is slower than engine speed;
   planetary gearing transmitting power between the rotor and said input such that input speed is slower than engine speed.

2. The drive unit of claim 1 the gearing further comprises:
   a bevel pinion driveably connectable to the engine; and
   a bevel gear meshing with the bevel pinion and secured to a layshaft.

3. The drive unit of claim 1 the gearing further comprises:
   a bevel pinion driveably connectable to the engine;
   a bevel gear meshing with the bevel pinion and secured to a layshaft;
   a pinion secured to the layshaft;
   a gear meshing with the pinion and secured to said input.

4. The drive unit of claim 1 wherein the planetary gearing further comprises:
   a sun gear driveably connected to the rotor, a ring gear held against rotation, a carrier driveably connected to the input, and planet pinions supported for rotation on the carrier and meshing with the sun gear and the ring gear.

5. The drive unit of claim 1 wherein the planetary gearing further comprises:
   a sun gear, a ring gear held against rotation, a carrier driveably connected to the input, and planet pinions supported for rotation on the carrier and meshing with the sun gear and the ring gear;
   a second sun gear driveably connected to the rotor, a second ring gear held against rotation, a second carrier driveably connected to the first sun gear, and second planet pinions supported for rotation on the second carrier and meshing with the second sun gear and the second ring gear.

6. The drive unit of claim 1 wherein:
   the electric machine further comprises a stator surrounding the rotor;
   the planetary gearing includes a non-rotating member; and the drive unit further comprises a casing fixed against rotation, the stator and nonrotating member being secured to the casing.

7. The drive unit of claim 1 wherein the differential further comprises:
   a third sun gear driveably connected to a first drive shaft;
   a third ring gear driveably connected to the gearing;
   a third carrier driveably connected to a second driveshaft;
   third planet pinions supported for rotation on the third carrier and meshing with the third sun gear; and
   fourth planet pinions supported for rotation on the third carrier and meshing with the third ring gear and the third planet pinions.

8. The drive unit of claim 1 wherein the differential is spaced along an axis from the planetary gearing; and
   the drive unit further comprises:
   a casing fixed against rotation;
   first and second bearing aligned with the axis, each bearing supporting the differential input on the casing for rotation about the axis.

9. The drive unit of claim 1 wherein the electric machine is an electric motor/generator.

10. A drive unit, comprising:
    an electric machine including a rotor;
    a differential including an input rotatable about an axis;
    gearing transmitting power between an engine and said input, whose speed is slower than engine speed;
    a drum secured to the gearing and said input;
    planetary gearing aligned with the axis, transmitting power between the rotor and said input, whose speed is slower than rotor speed, and including a single output secured to said input.

11. The drive unit of claim 10 wherein the gearing further comprises:
    a bevel pinion driveably connectable to the engine; and
    a bevel gear meshing with the bevel pinion and secured to a layshaft.

12. The drive unit of claim 10 wherein the gearing further comprises:
    a bevel gear meshing with the bevel pinion and secured to a layshaft;
    a pinion secured to the layshaft;
    a gear meshing with the pinion and secured to said input.

13. The drive unit of claim 10 wherein the planetary gearing further comprises:
    a sun gear driveably connected to the rotor, a ring gear held against rotation, a carrier driveably connected to the input, and planet pinions supported for rotation on the carrier and meshing with the sun gear and the ring gear.

14. The drive unit of claim 10 wherein the planetary gearing further comprises:
    a sun gear, a ring gear held against rotation, a carrier driveably connected to the input, and planet pinions supported for rotation on the carrier and meshing with the sun gear and the ring gear;
    a second sun gear driveably connected to the rotor, a second ring gear held against rotation, a second carrier driveably connected to the first sun gear, and second planet pinions supported for rotation on the second carrier and meshing with the second sun gear and the second ring gear.

15. The drive unit of claim 10 wherein the differential further comprises:
    a third sun gear driveably connected to a first drive shaft;
    a third ring gear driveably connected to the drum;
    a third carrier driveably connected to a second driveshaft;
    third planet pinions supported for rotation on the third carrier and meshing with the third sun gear; and
    fourth planet pinions supported for rotation on the third carrier and meshing with the third ring gear and the third planet pinions.

16. The drive unit of claim 10 wherein the differential is spaced along the axis from the planetary gearing; and
    a casing fixed against rotation;
    first and second bearing aligned with the axis, each bearing supporting the drum on the casing for rotation about the axis.

17. The drive unit of claim 10 further comprising a coupler for alternately opening and closing a drive connection between the engine and the input.

18. The drive unit of claim 10 wherein the electric machine is an electric motor/generator.

19. A drive unit, comprising:
    an electric machine including a rotor;
    a differential including an input;
    gearing including a meshing bevel pinion and bevel gear transmitting power from an engine to a layshaft, and a meshing pinion and gear transmitting power from the layshaft to said input such that input speed is slower than engine speed;
    planetary gearing transmitting power between the rotor and said input such that input speed is slower than engine speed.

20. The drive unit of claim 19 wherein the planetary gearing further comprises:
    a sun gear, a ring gear held against rotation, a carrier driveably connected to the input, and planet pinions supported for rotation on the carrier and meshing with the sun gear and the ring gear;
    a second sun gear driveably connected to the rotor, a second ring gear held against rotation, a second carrier driveably connected to the first sun gear, and second planet pinions supported for rotation on the second carrier and meshing with the second sun gear and the second ring gear.

* * * * *